United States Patent [19]

Resch

[11] 4,313,303
[45] Feb. 2, 1982

[54] BRAKE FORCE BOOSTER, ESPECIALLY FOR MOTOR VEHICLES

[75] Inventor: Reinhard Resch, Stuttgart, Fed. Rep. of Germany

[73] Assignee: Daimler-Benz Aktiengesellschaft, Stuttgart, Fed. Rep. of Germany

[21] Appl. No.: 973,012

[22] Filed: Dec. 26, 1978

Related U.S. Application Data

[63] Continuation of Ser. No. 786,772, Apr. 12, 1977, abandoned.

[51] Int. Cl.$^3$ .............................................. B60T 13/20
[52] U.S. Cl. .................................... 60/556; 91/460
[58] Field of Search ................ 60/547 R, 553, 555, 60/556, 562, 593, 547 A, 548; 91/460, 391 R, 391 A

[56] References Cited

U.S. PATENT DOCUMENTS

| | | | |
|---|---|---|---|
| 2,976,686 | 3/1961 | Stelzer | 60/555 |
| 3,831,491 | 8/1974 | Thomas | 91/460 |
| 3,915,066 | 10/1975 | Thomas | 91/460 |
| 3,928,970 | 12/1975 | Farr | 60/562 |
| 3,967,538 | 7/1976 | Thomas | 91/460 |
| 3,988,967 | 11/1976 | Orzel | 91/460 |
| 4,034,566 | 7/1977 | Suketomo | 91/460 |

FOREIGN PATENT DOCUMENTS 2335181 1/1975 Fed. Rep. of Germany .... 60/547 R

Primary Examiner—Abraham Hershkovitz
Attorney, Agent, or Firm—Craig and Antonelli

[57] ABSTRACT

A brake force servo-device, especially for motor vehicles, with a control piston, selectively actuatable preferably by a brake pedal, which cooperates with a connecting valve connected with a pressure medium source and which is operable to displace a flow medium out of its cylinder space for the actuation of the connecting valve; a working piston is thereby actuated by the pressure controlled by the connecting valve, whereby the control piston is constructed as one-piece control piston having an annular step and is sealed off, on the one hand, within the area of its entry into the brake force servo-housing and, on the other, in proximity of its end face which projects into a working pressure space; the control piston thereby abuts at the working piston present in the working pressure space while the connecting valve is actuated by the flow medium displaced by the annular-shaped step of the control piston out of the annular space which is formed between its two bearing places.

13 Claims, 1 Drawing Figure

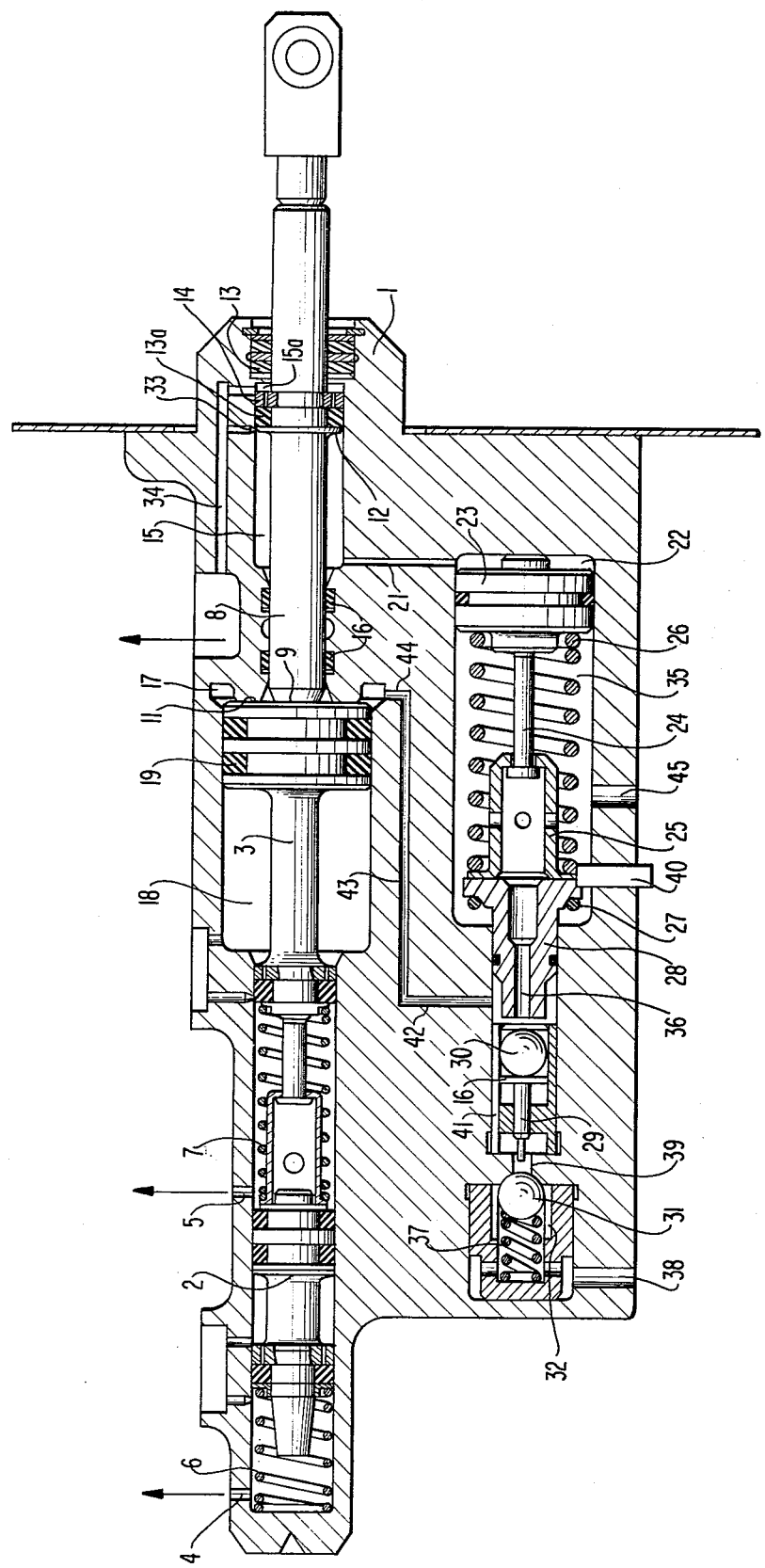

BRAKE FORCE BOOSTER, ESPECIALLY FOR MOTOR VEHICLES

This is a continuation of application Ser. No. 786,772, filed Apr. 12, 1977, now abandoned.

The present invention relates to a brake force booster or servo-device, especially for motor vehicles, with a selectively actuatable control piston preferably actuatable by the brake pedal, which cooperates with a connecting valve connected with a pressure medium source and by means of which a flow medium is displaceable out of the cylinder space of the control piston for the actuation of the connecting valve, and with a working piston, preferably with a tandem working piston which is acted upon by the pressure controlled by the connecting valve.

A brake force booster or servo-device with a control piston is described in the German Offenlegungsschrift 2,125,880, in which a control pressure is being built up during the actuation of the control piston, which actuates a connecting valve controlling the working pressure. In this prior art construction of a brake force booster or servo-device, which operates by means of a pressure medium, a mechanical drive or actuating connection between the control piston and the working piston exists for the case that the booster or servo-device should fail. This brake force booster or servo-device, however, provides no direct feedback of the working pressure onto the input piston and therewith to the foot of the driver. In other known servo-device constructions, the control piston is so arranged that the pressure which is controlled from the pressure medium source by way of the connecting valve does not act directly on the actuating piston. The absence of the direct reaction pressure is effective in a disadvantageous manner on the pedal feel provided for the driver. A further disadvantage of this booster or servo-device, disclosed in the German Gebrauchsmuster 1,911,383, is the absence of a mechanical drive or actuating connection between the control piston and the actuating piston, whereby the brake system fails completely during the occurrence of a leakage between the control piston and the control cylinder.

The present invention is concerned with the task to provide a brake force booster or servo-device which does not exhibit the aforementioned disadvantages and in which, with an intact servo or booster installation, a translation results between the path of the input piston and the path of the output piston, which is larger than one. Additionally, in the servo-device according to the present invention, a direct feedback of the prevailing working pressure on the input piston and on the pedal should also exist.

The underlying problems are solved according to the present invention in that the control piston is constructed as one-piece stepped or differential piston and is supported sealed off, on the one hand, within the area of its entry into the brake force booster housing and, on the other, in proximity of its end face, which projects into a working pressure space and abuts at the working piston located thereat, and in that the connecting valve is actuated by the fluid medium which displaced by the ring-shaped step of the control piston out of the annular space resulting between its two bearing places. In order to achieve this, the brake force booster or servo-device is to be so constructed in further realization of the present invention that a valve spring may be arranged between a valve seating bolt actuating the connecting valve and the connecting valve piston acting on the valve seating bolt, on which acts from the other side the pressure produced by the control piston, which valve spring determines the valve actuating force of the connecting valve in dependence on the piston path of the connecting valve piston acted upon the control pressure.

During the retraction or release of the pedal pressure, it is to be furthermore assured within the scope of the present invention that any flow medium which is no longer needed, can flow off rapidly. Provision is made for that purpose that a return or by-pass valve opens in case of a reduction of the control pressure and after the reclosing of the connecting valve, which permits a return flow of relieved flow medium to the return or storage tank by way of a bore in the valve seating bolt of the connecting valve. The return or by-pass is assured by a separate valve, and in order that the latter also opens in every case, provisions are made that the valve spring is secured at the connecting valve by a restraining means for assuring the opening of the return or by-pass valve during a pressure reduction, which permits the installation of a return spring with a small spring force engaging at the bolt.

Accordingly, it is an object of the present invention to provide a brake force servo-device, especially for motor vehicles, which avoids by simple means the aforementioned shortcomings and drawbacks encountered in the prior art.

Another object of the present invention resides in a brake force booster in which a mechanical actuation exists between the control piston and the actuating piston to enable operation of the brake system even in case of failure of the hydraulic system.

A further object of the present invention resides in the brake force servo-device in which a direct feedback indication of the working pressure to the foot of the driver is assured to improve the pedal feel of the driver.

A still further object of the present invention resides in a brake force booster device, in which with an intact servo system, a translation will result between the path of the input piston and the path of the output piston which is larger than one.

A further object of the present invention resides in a brake force servo-device of the type described above, in which any fluid medium which is no longer needed when the brake pedal is taken back or released, is permitted to flow off rapidly.

Another object of the present invention resides in a brake force servo-system, especially for motor vehicles, which is simple in construction, utilizes relatively few parts and assures an operating reliability under all conditions.

These and further objects, features and advantages of the present invention will become more apparent from the following description when taken in connection with the accompanying drawing which shows, for purposes of illustration only, one embodiment in accordance with the present invention, and wherein:

The single FIGURE is a schematic longitudinal cross-sectional view through a brake force servo-device in accordance with the present invention, in which the housing of the connecting valve is incorporated into the servo housing, properly speaking, and in which a single part therefore serves as housing for the master cylinder with the control piston and for the connecting valve.

Referring now to the single FIGURE of the drawing, a booster or servo-housing 1 accommodates the working pistons 2 and 3 which cooperate with connections 4 and 5, with which lines for the individual brake circuits can be connected.

The working pistons 2 and 3 are supported at return springs 6 and 7. An actuating member 8, constructed as control piston, is able to abut with its end face 9 at the adjacent end face 11 of the working piston 3. The pedal (not shown) actuatable by the driver is connected with the control piston 8. The control piston 8 is constructed as one-piece stepped or differential piston having the annular step 12. The control piston 8 is sealed off against the outside by a seal 13 within the area of its entry into the servo-housing 1 and is guided by way of a piston shoulder 14.

A seal 13a seals the annular space 15 resulting from the adaptation to the annular step 12, with respect to a re-aspiration or suction space 15a. On the other side, namely, within the area of and adjoining the end face 9, the control piston 8 is supported and sealed by means of seals 16 which separate the annular space 15 from the working pressure space 17, from which the flow medium acts on the end face 11 of the working piston 3. This working piston 3 moves within a cylindrical working piston space 18, which is sealed off with respect to the working pressure space 17 by the seals 19. The annular space 15 is connected with a control pressure space 22 by way of a bore 21. Flow medium forced into this space 22 by the control piston 8 acts on the connecting or engaging valve piston 23. A valve spring 26 is secured at the connecting valve piston 23 by means of a fastening bolt 24 and a hat-shaped restraining sleeve 25. As a result of the restraint of the valve spring 26, the return spring 27 of the valve seating bolt 28 need not be dimensioned as strong. The movement of the valve seating bolt 28 caused by the return spring 27 in the direction toward the engaging valve piston 23 encounters a limitation by an abutment pin 40. The valve seating bolt or piston 28, in case of a pressure increase in the control pressure space 22, can be displaced in the direction toward a valve plunger 29 together with a ball 30 as part of a reservoir connecting valve 32. Pressure is fed to this reservoir connecting valve 32 from a pressure medium tank (not shown).

The annular space 15 is in communication with a reservoir tank (not shown) by way of an equalization bore 33 and a further bore 34.

During the actuation of the control piston 8, the seal 13a passes over the equalization bore 33 which is closed as a result thereof. Thereafter, pressure medium is displaced out of the annular space 15 by way of the bore 21 into the control pressure space 22. As a result of the pressure produced thereat, the connecting valve piston 23 is displaced in its cylindrical bore 35. The valve seating piston 28 is displaced toward the valve plunger 29 under compression of the restrained valve spring 26. Upon contact of the valve seating piston 28 with the ball 30, a valve seating bore 36 is closed off and then the valve plunger 29 is displaced toward the valve ball 31. The ball 31 is thereupon displaced against the compression of a spring 37 and therewith the reservoir connecting valve 32 is opened. As a result thereof, pressure medium which is supplied from the pressure medium tank (not shown) to the bore 38, is introduced into the working pressure space 17 by way of the reservoir connecting valve 32, the connecting bore 39, a groove 41, and bores 42, 43 and 44. As a result thereof, the working piston 3 is displaced in the working space 18 and as a consequence thereof, the working piston 2 is also displaced, which both act on the brake cylinders (not shown). The brakes are brought into engagement in a conventional manner by the displacement of the working pistons 2 and 3. Simultaneously therewith, the control piston 8 transmits a direct reaction pressure onto the brake pedal.

If the pressure on the end face of the valve seat of the valve seating bolt 28, which is closed by means of the valve ball 30, exceeds a predetermined value, then the valve seating bolt 28 is displaced against the force of the valve spring 26 so far until an equilibrium will establish itself between spring force and the reaction force acting on the valve seating bolt 28. The reservoir connecting valve 32 is thereby closed and as a result thereof, the pressure medium source connection to the working cylinder is interrupted.

If the control piston 8 is taken back or retracted, then by reason of the space enlargement of the annular space 15, the pressure in the control pressure space 22 decreases and a limited spring relief becomes possible thereby by way of the connecting valve piston 23. The return or by-pass valve formed by the valve ball 30 thereby opens. A part of the working pressure medium can then flow back to the reservoir tank (not shown) by way of the valve seating bore 36, the cylindrical bore space 35 and groove 45. The pressure decrease of the working pressure medium takes place for such length of time until a force equilibrium between the spring force of the valve spring 26 and a pressure force acting on the end face of the valve seat of the valve seating bolt 28 will establish itself.

Simultaneously with the working pressure decrease, the working piston 3 moves back in the working piston space 18 and the brake force is reduced thereby in a known manner.

The connecting valve 23 and the associated actuating members may be constructively so dimensioned that after the actuation of the brake force servo-device, with an intact servo installation, a translation results between the working piston path and the control piston path which is larger than one.

In case that the servo-installation has failed, i.e., no pressure is supplied any longer to the reservoir connecting valve 32 by way of the bore 38, the brake can be operated also without servo-assist. As illustrated in the drawing, the control piston 8 abuts directly at the working piston 3. During the actuation of the brake, the working piston 3 can therefore be mechanically actuated directly by the movement of the control piston 8. The movement translation between the working piston 3 and the control piston 8 is then equal to one. The flow medium which is present in the annular space 15 is thereby continued to be displaced out of the annular space by way of the bore 21 and is conducted into the control pressure space 22. The connecting valve piston 23 is thereby displaced against the pressure of the valve spring 26. Even though also the reservoir connecting valve 32 is opened during this movement, this has no consequence since no pressure is supplied through the bore 38.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A brake force servo-device, comprising
a servo-housing,
a selectively actuatable control piston means arranged in a cylinder space in the servo-housing,
a connecting valve means operatively connected with the selectively actuatable control piston means and with a pressure medium source,
said control piston means being operable to displace a flow medium out of the cylinder space for an actuation of the connecting valve means, and
working piston means arranged in a working pressure space means adapted to receive a pressure medium from the pressure medium source, the working piston means is acted upon by the pressure medium from the pressure medium source with the pressure of the pressure medium being controlled by the connecting valve means, characterized in that
the control piston means is constructed as a one piece differential piston having an annular step and an end face spaced from the annular step, the end face projects into the working pressure space means of the working piston means and is in direct mating engagement with an end face of the working piston means during operation of the brake force servo-device so that a pressure acts on an entire surface of the end face of the differential piston,
a first seal means is provided for sealing the control piston means within an area of entry of the control piston means into the servo-housing,
a second seal means is provided for sealing the control piston means in proximity of the end face of the control piston means projecting into the working pressure space means,
the first and second seal means defining an annular space therebetween for forming the cylinder space from which the pressure medium is displaced by the control piston means,
the connecting valve means is actuated by pressure medium displaced by the annular step of the control piston means out of the annular space, and in that
the pressure source connecting valve means is provided for controlling a supply of the pressure medium to the working pressure space means,
the connecting valve means includes
a connecting valve piston means having a control pressure space in communication with the annular space,
a valve seat piston means acted upon by the connecting valve piston means is provided for actuating the pressure source connecting valve means, and,
a valve spring means is disposed between the valve seat piston means and the connecting valve piston means,
the control piston means produces a control pressure in the control pressure space which acts on a side of the connecting valve piston means opposite the valve seat piston means so as to cause a displacement of the connecting valve piston means and the valve seat piston means, and in that
the valve spring means produces a force which acts on a side of said connecting valve piston means opposite the control pressure space, said force opposing the force provided by the control pressure in the control pressure space acting upon the connecting valve piston means for a displacement of the connecting valve piston means and the valve seat piston means so as to enable an actuation of the pressure source connecting valve means.

2. A brake force servo-device according to claim 1, characterized in that the control piston means is actuatable by a brake pedal.

3. A brake force servo-device according to claim 2, characterized in that the working piston means is a tandem working piston.

4. A brake force servo-device according to claim 1, characterized in that a check valve means is provided which opens upon a reduction of the control pressure and after a reclosing of the pressure source connecting valve means for enabling a flow back of the pressure medium from the working pressure space means to a return tank, said connecting valve means including a bore, said check valve means arranged with respect to said bore so as to be operable to enable the flow back of the pressure medium to the return tank by way of the bore.

5. A brake force servo-device according to claim 4, characterized in that a restraining sleeve means and a fastening bolt means are provided for securing the valve spring means to the connecting valve piston means so as to enable an opening of the check valve means during a pressure reduction at the connecting valve piston means with a use of a return spring with a smaller spring force than the force of the valve spring means which engages the valve seat piston means.

6. A brake force servo-device according to claim 4, characterized in that a restraining sleeve means and a fastening bolt means are provided for securing the valve spring means to the connecting valve piston means so as to enable an opening of the check valve means during a pressure reduction at the connecting valve piston means with a use of a return spring with a smaller spring force than the force of the valve spring means which engages the valve seat piston means.

7. A brake force servo-device according to claim 1, characterized in that a check valve means is provided which opens upon a reduction of the control pressure and after a reclosing of the connecting valve means for enabling a flow back of pressure medium from the working pressure space means to a return tank, the valve seat piston means includes a bore, said check valve means are arranged with respect to the bore so as to be operable to enable the flow back of the pressure medium to the return tank by way of the bore.

8. A brake force servo-device according to claim 1, characterized in that a valve plunger means is provided for selectively actuating said pressure source connecting valve means, said valve plunger means being arranged between the valve seat piston means and pressure source connecting valve means so that a displacement of the valve seat piston means results in a displacement of the valve plunger means thereby opening the pressure source connecting valve means.

9. A brake force servo-device according to claim 8, characterized in that a check valve means is provided at the valve plunger means for controlling a return flow of the pressure medium from the connecting valve means to a return tank upon a closing of the connecting valve means and a reduction in the control pressure by the control piston means.

10. A brake force servo-device according to claim 9, characterized in that at least one bore means is provided in the valve seat piston means for receiving the return flow of the pressure medium from the working space means, the at least one bore means communicates with a bore space provided on a side of the connecting valve piston means opposite the side acted upon by the control pressure, and in that means are provided for communicating the bore space with the return tank.

11. A brake force servo-device according to claim 10, characterized in that the check valve means is arranged so as to close the at least one bore means when the connecting valve means is in an open position.

12. A brake force servo-device according to claim 11, characterized in that a restraining sleeve means and fastening bolt means are arranged in said bore space for securing said valve spring to the connecting valve piston means.

13. A brake force servo-device according to claim 12, characterized in that an abutment means is provided for limiting a return movement of the connecting valve piston means upon a reduction in the control pressure.

* * * * *